UNITED STATES PATENT OFFICE 2,456,783

SILOXANE COPOLYMERS

James Franklin Hyde, Corning, N. Y., assignor to Corning Glass Works, Corning, N. Y., a corporation of New York No Drawing. Application November 27, 1942, Serial No. 467,146

8 Claims. (Cl. 260—46.5)

This invention relates to the polymerization of products obtained by the hydrolysis and dehydration of organosilicon compounds.

This application is a continuation-in-part of my co-pending application Serial Number 432,528, filed February 26, 1942.

The hydrolysis of a silicon compound of the type $SiX_4$, where X is any hydrolyzable atom or group, such as halide, ester, hydride, etc., does not result in a simple hydroxy compound but produces instead a brittle, insoluble, infusable gel comprising a three-dimensional network of structural units composed of siloxane linkages as a result of the concurrent or subsequent loss of water from the intermediately formed hydroxy compound,

TYPE I

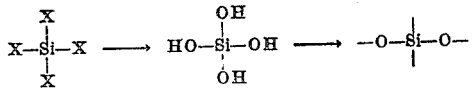

The formation of a siloxane linkage requires the close approach of two hydroxyl groups. It is apparent that, in the formation of such a rigid structure, many hydroxyl groups become isolated and block some of the possible cross linkages. As the structural network becomes more complicated, dehydration becomes increasingly more difficult, and the result is a partially dehydrated silica gel of poor dimensional stability.

Organo-substituted silicon compounds of the type $RSiX_3$, are prepared by means of the well-known Grignard reaction, where R may be any organic radical which is capable of reacting with magnesium to form a Grignard reagent. Such substituted compounds are also hydrolyzed on treatment with water, although the reaction is less vigorous than in the case of the unsubstituted silicon compounds under comparable conditions. Here, also concurrent dehydration or condensation with splitting out of water may occur so that a partially dehydrated product may result which can further be dehydrated by heat.

TYPE II

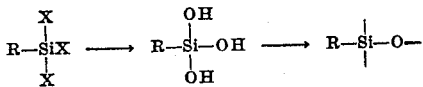

Here it will be seen that in each structural unit one of the four silicon bonds is blocked by the organic radical R, and only three siloxane linkages can form. Such compounds are still capable of three-dimensional polymerization.

The chemical and structural changes occurring in this type of substituted compounds are the same as those described above in the formation of silica gel. The chief distinction arises from the fact that the property of solubility in organic solvents, particularly in the lower stages of condensation, is acquired due to the presence of the hydrocarbon radical. The tendency of intermediate partially dehydrated products to further dehydrate is also decreased. The latter tendency is more noticeable with increasing size of the radical. As the stage of essentially complete dehydration is approached, the mono-substituted products, which in reality are substituted silica gels, lose their solubility and become hard and brittle. However, there is a marked improvement in dimensional stability over silica gel.

On substituting a second organic radical, which may or may not be different from the first, a compound of the type $RR'SiX_2$ results. Such compounds also may be hydrolyzed and dehydrated, the dehydration probably proceeding to some extent concurrently with the hydrolysis, particularly if the temperature is allowed to rise.

TYPE III

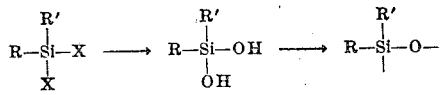

In each structural unit two of the four silicon bonds are now blocked by the organic radicals R and R', and only two siloxane linkages are possible. Hence a three-dimensional network is no longer possible and the resulting liquid or solid polymers can comprise only chain and cyclic structures. Intermediate crystalline di-hydroxy compounds can in some instances be isolated. The final products which are usually resinous in character bear little physical resemblance to silica gel but are closely related thereto in chemical structure, differing only in the restriction of possible siloxane linkages.

Compounds of the type $RR'R''SiX$, when hydrolyzed and dehydrated, yield very simple oxides in the structural unit of which three of the four silicon bonds are blocked by the organic radicals R, R' and R''.

TYPE IV

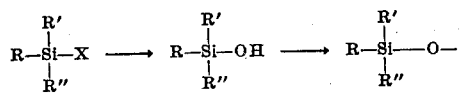

In this case, ease of hydrolysis is further diminished and in some cases the intermediate hydroxy compounds can be isolated. The completely dehydrated product is dimeric because only one siloxane linkage can be formed. The dimers are either crystaline or liquid.

Prior attempts to utilize the above described reactions have not contemplated combinations thereof, but have been confined more or less to the individual reactions and their products. Such products, as shown above, have limited utility and the range of properties obtainable in the products of a given type of reaction is relatively restricted. For example, the product resulting from type I reaction is an insoluble, infusible gel of little utility; type IV reaction yields generally inert liquid products which, although they are soluble in organic solvents, cannot be polymerized beyond the dimer and hence cannot be utilized per se for coating compositions, resinous impregnants and the like.

One of the objects of my invention is to provide a method of preparing organo-siloxanes having in part the formula RR'R''SiO where R, R', and R'' represent the same or different organic radicals.

Another object of the present invention is to provide new compositions of matter comprising organo-siloxanes having in part the formula RR'R''SiO where R, R' and R'' represent the same or different organic radicals.

Another object is to produce liquid products of varying viscosity.

Another object is to produce thermoplastic resinous products.

Another object is to produce thermosetting resinous products.

My new method comprises mixing a compound of the type RR'R''SiX with one or more compounds of the types, SiX$_4$, RSiX$_3$, RR'SiX$_2$, and RR'R''SiX, where R, R' and R'' are the same or different organic radicals and X is any hydrolyzable atom or group, and causing them to hydrolyze together and to become inter-condensed. This is best accomplished by introducing into the mixture by dropwise addition thereto the amount of water which is calculated for complete hydrolysis of the mixture and which preferably is dissolved in from two to four volumes of a common solvent such as alcohol, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above recited procedure in general is to be preferred. The use of a water miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put. Also in order to better control the properties of the resulting product it is desirable to have the starting materials substantially pure, or at least free of other hydrolyzable compounds which tend to produce unwanted co-polymeric combinations.

In any mixture of hydrolyzable silicon compounds, one or more of which is organo-substituted and contains from one to three hydrolyzable atoms or groups attached to the silicon atom, co-hydrolysis and dehydration by this method will result in inter-condensation or formation of interconnecting oxygen linkages between the silicon atoms of the various compounds. The variety of the substituted organic radicals is limited only by their ability to form a Grignard reagent. In other words, the organo-silicon compounds which may be employed in my process include all such compounds which contain one or more hydrolyzable atoms or groups and which may be prepared by means of the well-known Grignard reaction. The radicals which may thus be substituted may include alkyl radicals such as methyl, ethyl, propyl, isopropyl, butyl, isobutyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di- and tri-ethyl phenyls, mono-, di- and tri-propyl phenyls, etc.; naphthyl, mono- and poly-alkyl naphthyls, as methyl napthyl, diethyl naphthyl, tripropyl naphthyl, etc.; tetrahydronaphthyl; anthracyl, etc.; aralkyl such as benzyl, phenylethyl, etc.; alkenyl such as methallyl, allyl, etc.

If the hydrolyzable group or groups of all of the compounds in the mixture to be hydrolyzed are halides, it is preferable to employ dioxan as the solvent because it is inert to the halides. If the mixture contains both halides and esters the former can be converted to esters by the slow addition of dry alcohol to the mixture, or the mixture can be diluted with dioxan and treated with aqueous alcohol. When the mixture contains only esters any water miscible solvent may be used together with a trace of acid such as HCl as catalyst. In this case, alcohol may be preferred on account of its relatively low cost. Mixtures of water miscible solvents may be used.

In the above described method, the slow incorporation of water into the homogenous solution ensures that hydrolysis is not permitted to proceed unchecked, whereby the more reactive compound or compounds, that is, compounds containing few or no substituted organic radicals per silicon atom, would be more completely hydrolyzed and condensed before the less reactive or more highly substituted compounds have had an opportunity to react. On the contrary, the less reactive compounds are thus given a greater opportunity to hydrolyze simultaneously with the more reactive compounds than would be the case if the hydrolysis were conducted rapidly. Under these circumstances, simultaneous condensation of the various intermediate hydroxy compounds takes place and an intimate intermolecular combination through siloxane linkages of silicon atoms bearing different numbers and kinds of organic radicals becomes possible to the fullest extent. This ensures a true inter-condensation with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity and in some cases, if carried to completion, results in resinous solid products. The desired degree of polymerization will depend largely upon the contemplated use of the product and may be varied at will, since the final physical properties depend directly on the total number and disposition of the siloxane linkages, the latter being controlled by the relative amounts of the various types of hydrolyzable compound initially present.

The various classes of organo-siloxanes which can be produced by my method may be represented in the following manner as combinations of the various structural units, bearing in mind that the structural units are chemically combined with each other by siloxane linkages, that the precentage of each type of unit may be varied at will and that the properties of the resulting products will show corresponding variations which can be predicted in making compositions for a particular purpose.

Class 1. 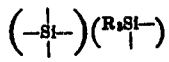

Class 2. 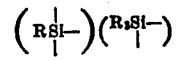

Class 3. 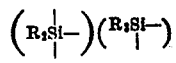

Class 4. 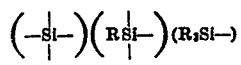

Class 5. 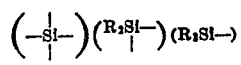

Class 6. 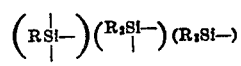

Class 7. 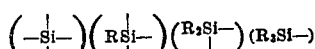

Class 8. 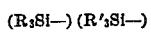

It is to be understood that the order in which the structural units of the various organo-siloxanes is represented has no significance because the units may be joined in a multiplicity of ways to form chain and cyclic structures and combinations thereof. Also, the organic radical or radicals in each structural unit may be varied in kind.

The partially dehydrated organo-siloxanes or hydrolysis products, after removal of solvents, are generally liquids of various viscosities and they vary in the extent to which dehydration has occurred at this stage. The ease of dehydration and the physical properties of the completely condensed organo-siloxanes vary with the kind of substituted organic radicals and with their number or with the final ratio of oxygen to silicon. Subsequent heating is usually necessary for complete dehydration, particularly when the oxygen to silicon ratio is greater than one. The extent of heating necessary depends upon the ease of dehydration which in turn depends upon the molecular size of the organic radical or radicals present and the number of possible siloxane linkages, that is, the final oxygen to silicon ratio. Products containing methyl radicals dehydrate more readily than those containing ethyl, propyl, etc., radicals or phenyl radicals and in general products containing alkyl radicals dehydrate more readily than those containing aryl radicals. Ease of dehydration also increases as the number of radicals per silicon atom increases or as the final oxygen to silicon ratio decreases. When this ratio is less than one, the organo-siloxanes are oils of relatively low viscosity. Their volatility decreases with increasing molecular size of the radicals and at the same time the viscosity may increase somewhat. As the final oxygen to silicon ratio increases from 1.0 to 1.3, there is a corresponding increase in molecular complexity or the number of siloxane linkages and an accompanying increase in viscosity. When the ratio is in the neighborhood of 1.3 and aryl radicals predominate, particularly on the mono-substituted silicon atoms, the viscosity increases to such an extent that the organo-siloxane is a thermoplastic solid which may be fused and solidified by repeated heating and cooling. As the oxygen to silicon ratio is increased to the neighborhood of 1.5 and beyond (approaching 2), the organo-siloxanes tend to become thermosetting and more particularly if the molecular size of the radicals is decreased.

Thus it will be seen that uniformity of behavior not only makes possible a wide variation in properties of the compositions, including viscosity, vapor pressure, melting range, setting rate, hardness, toughness, etc., but it also enables one to predict the most suitable combination of intermediate compounds for the production of an organo-siloxanes for the desired purpose.

The following examples will illustrate the mode of operation of the process and the character of the resulting products. In the examples abbreviations are used to designate certain radicals and groups thus: methyl (Me); ethyl (Et); ethoxy (OEt); phenyl ($\phi$); benzyl ($\phi CH_2$); $\beta$-phenyl ethyl ($\phi CH_2 CH_2$); tolyl (Me$\phi$); zylyl (Me$_2\phi$).

*Example 1*

A small sample of liquid phenylsilicic acid, $\phi SiOOH$, in benzene solution was boiled down to remove water. Benzene was again added. A volume of $\phi Me_2 SiCl$, equal to the phenyl silicic acid was then added. After evolution of HCl had ceased the solution was evaporated on the hot plate. A rather hard brittle resin remained after continuing the heating for a short time.

*Example 2*

A mixture of equi-molecular parts of $\phi SiCl_3$ and $\phi Me_2 SiCl$ was treated dropwise with water dissolved in dioxane. Addition was stopped when a turbidity developed which did not disappear with vigorous shaking. The resultant mixture was poured into water and the immiscible product was separated, washed and dried. It was a viscous oil which remained liquid after twenty hours of heating at 180°–190° C. where it was amply exposed to air in a thin film. It was still essentially unchanged with no indication of evaporation after fifty hours at the same temperature.

Composition: $\left(\phi SiO-\right)_1 (\phi Me_2 SiO-)_1$  O/Si=1.25

*Example 3*

When MeSi(OEt)$_3$ and $\phi Me_2 SiCl$ in the molar ratio 3/1 were hydrolyzed and inter-condensed by dropwise addition of water, followed by evaporation of excess water and alcohol a thick oil remained, which was essentially unchanged after ninety-six hours at 180°–190° C.

Composition: $\left(MeSiO-\right)_3 (\phi Me_2 SiO-)_1$  O/Si=1.37

*Example 4*

0.3 part by weight of $\phi_3 SiCl$ and 11.6 parts by weight of MeSi(OEt)$_3$ were refluxed for a half-hour with 5.2 parts by weight of anhydrous alcohol. The amount of water required for complete hydrolysis was added dropwise to the mixture. Films of this material set to an infusible state within thirty minutes at 180° C.; they are more flexible than films of monomethyl silicon oxide alone.

Composition: $\left(MeSiO-\right)_{66} (\phi_3 SiO-)_1$  O/Si=1.48

*Example 5*

0.3 part by weight of $\phi_3 SiCl$ and 7.3 parts by weight of $\phi SiCl_3$ were dissolved in approximately two volumes of dioxane. An excess of distilled water was added dropwise at room temperature. The material was initially thermoplastic but set to an infusible resin on heating 3 to 25 hours at 180° C. It forms a good high temperature paint on admixture with appropriate pigments such as ochre, ultramarine, etc.

Composition: 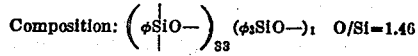 O/Si=1.46

Example 6

0.25 part by weight of $\phi_3SiCl$ and 2.21 parts by weight of $\phi SiCl_3$ were dissolved in 2.4 parts by weight of dioxane. The theoretical amount of water was added. Some material precipitated out which was redissolved by adding more dioxane. The product, after evaporating the solvents, was a tacky thermoplastic resin. Gradual thermosetting occurred on heating at 150° C., and after 12 to 18 hours heating it had set to a hard infusible coating.

Composition: 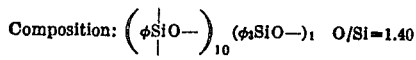 O/Si=1.40

Example 7

0.60 gram of $MeSi(OEt)_3$ and 0.33 gm. of $\phi_3SiCl$ were dissolved in 2.04 gms. of anhydrous ethyl alcohol. Twice the theoretical amount of water for complete hydrolysis, 0.20 gm., was added. The product was a soft resin which showed signs of hardening after five to six hours at 180° C. This material as films on glass plates will withstand much longer periods of heating at 180°–250° C. without crazing than will methyl silicic acid under similar conditions.

Composition: 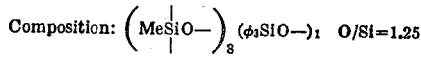 O/Si=1.25

Example 8

0.13 gram of $\phi_3SiCl$ and 0.78 gm. of $MeSi(OEt)_3$ were dissolved in 2.4 gms. of anhydrous ethyl alcohol. Twice the theoretical weight of water required for complete hydrolysis was added dropwise. The viscous soft resin obtained on evaporating alcohol and water was found to set rapidly on heating.

Composition: 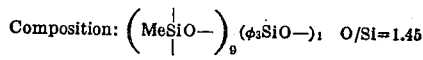 O/Si=1.45

Example 9

To a solution of $ME_3SiOEt$ and $\phi SiCl_3$ in the molar proportions 1/4 was added slowly 95% ethyl alcohol to effect hydrolysis and inter-condensation. Water was then added in slight excess. After boiling off the solvents, the viscous oil was slowly converted at 190° C. into a slightly tacky thermoplastic resin.

Composition: 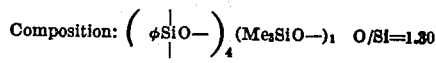 O/Si=1.30

Example 10

To a solution of $(\phi CH_2)_3SiCl$ and $MeSi(OEt)_3$ in the molar proportions 1/5, 95% ethyl alcohol containing a few drops of concentrated hydrochloric acid was added slowly with warming to effect hydrolysis and inter-condensation. Water was then added in excess. After evaporating the solvents, a hard but tough, non-brittle thermosetting resin was obtained in three hours at 190° C., which remained unaltered after an additional twenty-four hours at this temperature.

Composition: 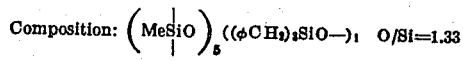 O/Si=1.33

Example 11

To a solution of $Me_3SiOEt$ and $\phi CH_2SiCl_3$ in the molar proportions 1/4 was added slowly 95% ethyl alcohol to effect hydrolysis and inter-condensation. Water was then added in slight excess. After boiling off the solvents, the very viscous liquid gave a good thermoplastic resin when heated at 190° C. for 48 hours. After this time it gradually set, although it was still slightly tacky at elevated temperatures.

Composition: 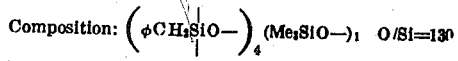 O/Si=1.30

Example 12

To a solution of $\phi_2MeSiOEt$ and $MeSi(OEt)_3$ in the molar proportions 1/3, 95% ethyl alcohol containing a few drops of concentrated hydrochloric acid was added slowly with warming to effect hydrolysis and inter-condensation. Water was then added in excess. After evaporating the solvents, a soft thermoplastic resin was obtained by six hours heating at 190° C. The resin had nearly set in 24 hours, and was quite tough though still somewhat soft and flexible after 48 hours at 190° C.

Composition: 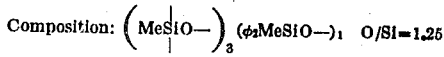 O/Si=1.25

As has been pointed out it is possible to predict the general properties of the organo-siloxanes on the basis of the oxygen/silicon ratio and the secondary effect of the size of the organic radicals. However, in all organo-silicon compounds the thermal stability of the carbon-silicon linkage varies with the kind of radical. It is necessary to take this into account when considering uses for organo-siloxanes. In general there is a decrease in thermal stability with increase in size of aliphatic radicals. The compositions containing allyl, methallyl, benzyl and $\beta$-phenylethyl radicals are relatively less stable than compositions containing such radicals as phenyl, methyl, ethyl, etc. Therefore certain temperature limitations are encountered in their uses.

I have found that organo-siloxanes which have in part the formula $RR'R''SiO$, that is, those produced in accordance with the present invention are unusually stable. Presumably, this greater stability is due to the blocking of Si—O—Si chains against further growth by the presence at the ends of the chains of a silicon atom having three organic radicals thus,

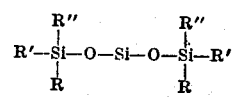

It will be seen that the organo-siloxanes produced by my method are not mixtures of individual polymers but are new compounds differing therefrom in homogeneity of structure and properties. It will further be seen that the new polymers may contain various different radicals attached to the same silicon atom and the individual silicon atoms may differ in the number and kind of radicals attached thereto in which respect the new polymers differ from previous organo-silicon polymers where each silicon atom was attached to the same kind of radicals. Such differences result in new compounds which embody various improvements over previous polymers with respect to temperature co-efficient of change of viscosity, thermal resistivity, chemical stability, electrical properties, etc.

The organo-siloxanes produced by my method may be adapted to various uses and for any specific use the physical properties and characteristics of the product can be controlled by the proper selection of the initial starting materials so as to obtain the desired oxygen to silicon ratio and a suitable variety of radicals attached to the silicon atom. Products which remain liquid with little or no tendency for further polymerization even at elevated temperatures include products having an oxygen to silicon ratio between 0.5 and 1.0 and particularly those containing lower alkyl radicals. Such products have good electrical properties whereby they may be used as the liquid filling medium for transformers, circuit breakers, submarine cables, condensers, etc. In general these products have an unusually low coefficient of change of viscosity with temperature and may find use in hydraulic pressure systems which are subjected to wide changes of temperatures or as lubricants for systems of moving parts operating under subnormal or abnormal temperatures.

More viscous liquid products such as those wherein the oxygen to silicon ratio lies in the neighborhood of 1.0 or more may also be used for lubricants and are particularly useful as damping media in delicate instruments and the like.

Thermoplastic and thermosetting products having an oxygen-silicon ratio usually greater than 1.0 are useful as molding compounds, film forming coatings, varnishes, impregnating agents for electrical insulation and the like. They may be applied as solutions of the incompletely condensed organo-siloxanes and after evaporation of the solvent can be further polymerized in situ. The more brittle products should be useful embedding media for condenser plates as well as molding compounds. Such products usually have an oxygen-silicon ratio of 1.5 or greater and may be thermoset in situ by heat.

What I claim is:

1. A copolymeric organo-siloxane comprising oxygen atoms, and organo-silicon units which correspond to the general formulae $RSi\equiv$ and $R'R''R'''Si-$, said units being joined to each other by said oxygen atoms through silicon-oxygen linkages, where R, R', R'' and R''' are alkyl radicals which are attached directly to silicon through carbon-silicon linkages, the silicon atoms of said units being the only silicon atoms in said organo-siloxane.

2. An incompletely condensed copolymeric organo-siloxane comprising oxygen atoms, hydroxyl groups, and organo-silicon units which correspond to the general formulae $RSi\equiv$ and $R'R''R'''Si-$, where R, R', R'' and R''' are monovalent hydrocarbon radicals which are attached directly to silicon through carbon-silicon linkages, said units being joined together by said oxygen atoms through silicon-oxygen linkages, and said hydroxyl groups being attached directly to silicon, the silicon atoms of said units being the only silicon atoms in said organo-siloxane.

3. A copolymeric organo-siloxane comprising hydrocarbon-substituted silicon units which correspond to the formulae $RSi\equiv$ and $R'R''R'''Si-$, respectively, and which are interconnected by oxygen atoms through siloxane linkages, where R, R', R'' and R''' are monovalent hydrocarbon radicals which are attached to silicon through carbon-silicon linkages, the silicon atoms of said units being the only silicon atoms in said organo-siloxane.

4. A copolymeric organo-siloxane comprising hydrocarbon-substituted silicon units which correspond to the formulae $RSi\equiv$ and $R'R''R'''Si-$, respectively, and which are interconnected by oxygen atoms through siloxane linkages, where R, R', R'' and R''' are monovalent hydrocarbon radicals which consist of lower alkyl and phenyl radicals and which are attached to silicon through carbon-silicon linkages, the silicon atoms of said units being the only silicon atoms in said organo-siloxane.

5. A copolymeric organo-siloxane comprising hydrocarbon-substituted silicon units which correspond to the formulate $(C_6H_5)Si\equiv$ and $(CH_3)_3Si-$, respectively, and which are interconnected by oxygen atoms through siloxane linkages, the silicon atoms of said units being the only silicon atoms in said organo-siloxane.

6. A copolymeric organo-siloxane comprising hydrocarbon-substituted silicon units which correspond to the formulae $(CH_3)Si\equiv$ and
$(C_6H_5)(CH_3)_2Si-$
respectively, and which are interconnected by oxygen atoms through siloxane linkages, the silicon atoms of said units being the only silicon atoms in said organo-siloxane.

7. A copolymeric organo-siloxane comprising hydrocarbon substituted silicon units which correspond to the formulae $RSi\equiv$ and $R'R''R'''Si-$, respectively, and which are inter-connected by oxygen atoms through siloxane linkages, where R, R', R'' and R''' are monovalent hydrocarbon radicals which consist of lower alkyl and aryl radicals and which are attached to silicon through carbon-silicon linkages, the silicon atoms of said units being the only silicon atoms in said organo-siloxane.

8. A copolymeric methyl siloxane comprising oxygen atoms and units which correspond to the general formulae $(CH_3)Si\equiv$ and $(CH_3)_3Si-$, respectively, said units being joined to each other by said oxygen atoms through silicon-oxygen linkages and said units being the only silicon units present in the siloxane.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |
| 2,371,050 | Hyde | Mar. 6, 1945 |
| 2,386,466 | Hyde | Oct. 9, 1945 |

OTHER REFERENCES

Rochow, chemistry of the Silicones, Wiley 1946, pp. 93, 94.

Mead, Trans. Journal of the Chemical Soc. (London), vol. 105, 1914, pp. 679 and 680.

Dilthey, Berichte Deut. Chem. Gesel., vol. 37, 1904, pages 1139 to 1142.

Kipping, Tr. J. Chem. Soc. (London), vol. 101, 1912, pages 2108, 2113, and 2114.

Hyde et al., Journ. Amer. Chem. Soc., vol. 63, May 1941, pages 1194 to 1196. (Copy in Scie. Libr.)

Andrianov, Journal. General Chemistry (USSR), vol. 8, 1938, pages 1255 to 1262. (Copy in Libr. of Congress.)

Beilstein, Handbuch Der Organische Chemie, vol. 16, page 905, 4th edition, 1933. (Copy in Div. 6.)